MOVING STAIRWAY

Filed May 4, 1949 6 Sheets-Sheet 1

Samuel Gustave Margles
Andrew Fabula
INVENTORS
BY Walter E. Bradley
ATTORNEY

Samuel Gustave Margles
Andrew Fabula
INVENTORS

BY Hatton & Bradley ATTORNEY

MOVING STAIRWAY

Filed May 4, 1949

Samuel Gustav Margles
Andrew Fabula
INVENTORS

BY [signature] ATTORNEY

Aug. 17, 1954 S. G. MARGLES ET AL 2,686,585

MOVING STAIRWAY

Filed May 4, 1949 6 Sheets-Sheet 4

Samuel Gustave Margles
Andrew Fabula
INVENTORS

BY Matthew E. Bradley
ATTORNEY

Samuel Gustav Margles
Andrew Fabula } INVENTORS

BY Matthew E. Bradley ATTORNEY

MOVING STAIRWAY

Filed May 4, 1949

6 Sheets-Sheet 6

Samuel Gustave Margles
Andrew Fabula
INVENTORS

BY Matthew E. Bradley ATTORNEY

Patented Aug. 17, 1954 2,686,585

UNITED STATES PATENT OFFICE 2,686,585

MOVING STAIRWAY

Samuel Gustave Margles, Brooklyn, N. Y., and Andrew Fabula, Hohokus, N. J., assignors to Otis Elevator Company, New York, N. Y., a corporation of New Jersey Application May 4, 1949, Serial No. 91,354

8 Claims. (Cl. 198—16)

The invention relates to moving stairways.

Moving stairways comprise an endless series of steps which are moved from one landing to another for the purpose of conveying passengers. The steps are connected together by running gear chains, one on each side of the stairway. These chains are driven by sprocket wheels at the upper end of the stairway, these wheels in turn being driven by the stairway driving motor. The running gear chains may also pass around sprocket wheels at the lower end of the stairway. The steps are supported on each side by wheels which run on tracks. A handrail is provided on each side of the stairway and is driven in synchronism with the steps by the stairway driving motor.

The object of the invention is to provide a moving stairway which is quiet in operation and economical to manufacture and install.

In carrying out the invention according to the arrangement which will be described, the stairwell opening is extended at the upper end to provide a space beyond the sprocket wheels for the stairway driving motor. The stairway truss is extended through this space and forms a support for the driving motor. The driving motor is connected to the moving stairway drive shaft by a direct gear connection and the braking is done on the motor shaft alone.

The supporting wheels for the front end of the step are arranged between the chain links and the inbetween chain pins are also provided with wheels the same size as the step wheels. All of the wheels run on the supporting tracks for the steps and are of a small size. All of these wheels mesh with the teeth of the driving sprockets. Also, all of the wheels are rubber tired and the chain links are supported by rubber tired rollers as the transition between track and sprocket wheels takes place. The trailer wheels are of the same size as the chain wheels and are rubber tired. The tracks upon which the wheels run are extrusions.

The handrails have single wrap traction drives. The desired handrail tension is had by providing each handrail with an adjustable tightener wheel around which the handrail passes with a reverse bend on its return run. The handrails are installed as endless loops, the splices being made at the factory. Each handrail has a steel tape insert the ends of which are joined by vulcanizing when the handrail splice is made.

The various features and advantages of the invention will be gained from the above statements and from the following description and appended claims.

Figures 1, 22, 23:
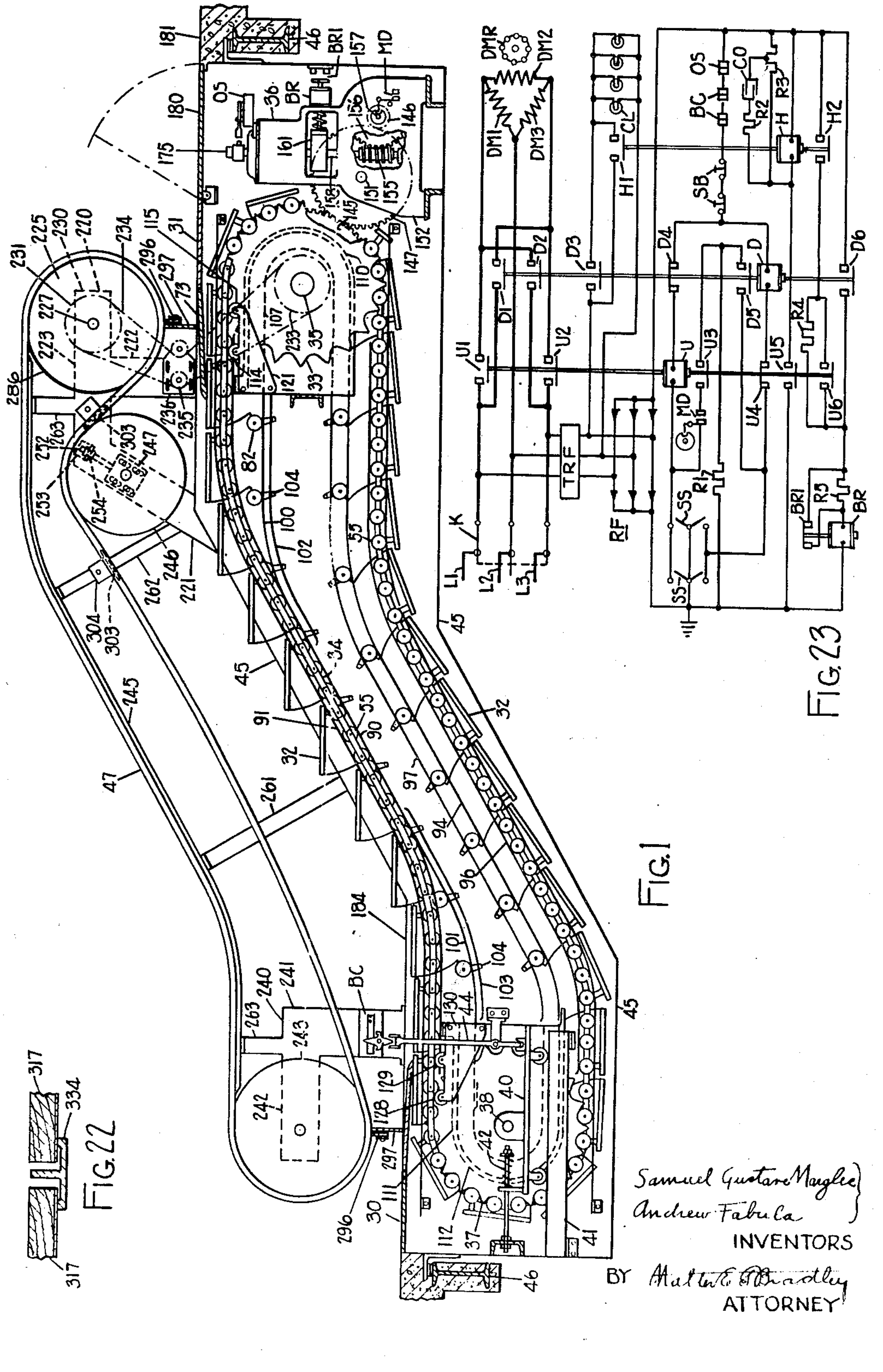
Figure 1 is a somewhat schematic view in side elevation, with parts removed and parts in section, of a moving stairway embodying the invention.
Figure 22 is a detail in section taken along the line 22—22 of Figure 6 illustrating a joint between balustrade side panels.
Figure 23 is a schematic wiring diagram of the control circuits for the moving stairway.

Referring first to Figure 1, the moving stairway extends between a lower landing 30 and an upper landing 31. The stairway comprises an endless series of steps 32 driven at the upper end of the stairway by means of sprocket wheels 33 through running gear chains 34, a sprocket wheel and running gear chain being arranged on each side of the stairway. The sprocket wheels are mounted on and driven by the main drive shaft 35, driven in turn by an electric motor 36. The stairwell opening is extended at the upper end to provide a space for the motor beyond he sprocket wheels. At the lower end of the stairway, the running gear chains pass around idler sprocket wheels 37 mounted on a shaft 38 in turn rotatably supported by a longitudinally movable carriage 40. The carriage runs on tracks 41 and is biased as by a spring 42 to maintain tension in the running gear chains. A broken chain switch BC is provided for each running gear chain, these switches being positioned on opposite sides of the carriage. Each switch is provided with an operating lever 44 arranged for operation by the carriage upon abnormal displacement in either direction of the running gear chain for which it is provided. The motor 36, main drive shaft 35 and carriage 40 are mounted on the stairway truss 45, in turn supported on I beams 46 secured to the building framework, the truss extending through the stairwell space beyond the driving sprocket wheels to form a support for the motor. The stairway also has a pair of endless moving handrails 47, one at each side thereof. These handrails are driven from motor 36 to operate in synchronism with the steps.

Referring now to Figures 2, 3, 4 and 5, each of the running gear chains 34 comprises a series of pairs of links, arranged alternately as inner and outer pairs. The links 50 of the inner pairs are wider than the links 51 of the outer pairs to support bushings 52 for the chain pins 53 and step axles 54, the step axles being of the same diameter as the chain pins. A wheel 55 is mounted on each pin and step axle, these wheels being of the ball bearing type and located centrally between the links by a collar 56 and spring 57 arranged on the bushing on opposite sides of the inner race of the ball bearing 58. These chain wheels are provided with rubber tires 60 vulcanized to the rims and tapered toward their tread surfaces. These chain wheels both on the chain pins and step axles are of the same size and construction, a three inch diameter wheel having been found satisfactory.

Each step comprises a frame made up of a pair of step yokes 64 to which the step riser 65 and top plate 66 are secured. These yokes are formed of aluminum alloy castings. A step tread 67 is secured to the tread plate as by screws 70. This step tread is provided with a plurality of longitudinally extending cleats 71 for meshing with the teeth 72 of a comb-plate 73 at each end of the stairway. These teeth are formed on comb sections 68 secured to supporting section 69 of the combplate. Thus, if any of the combplate teeth become damaged, the comb section is replaced instead of replacing the whole combplate. Each step tread is provided with a pair of grooves 74 extending crosswise of the step near the front and back thereof. These grooves are termed demarcation lines, being painted black and serving to aid the passengers in identifying the separate steps.

The step axle 54 extends across the step frame and is mounted in bushings 75, one on each side of the frame. These bushings are axially slidable in apertures 76 formed in the step yokes and are held in place by pins 77 extending into holes in the bushings and retractable manually against springs 80. Openings 81 lead into the apertures 76 to permit removal of the axle after the bushings have been slid aside. The chain wheels 55 on the step axle are mounted on the ends of the axle which extend beyond the step frame. These wheels support the front end of the step. Each step has two trailer wheels 82 which are in the form of rubber tired ball bearing wheels of the same size and construction as the chain wheels. These trailer wheels are mounted on stub shafts 83 secured to extensions 84 of step yokes 64 and support the rear end of the step.

Figures 4, 5, 7, 24:
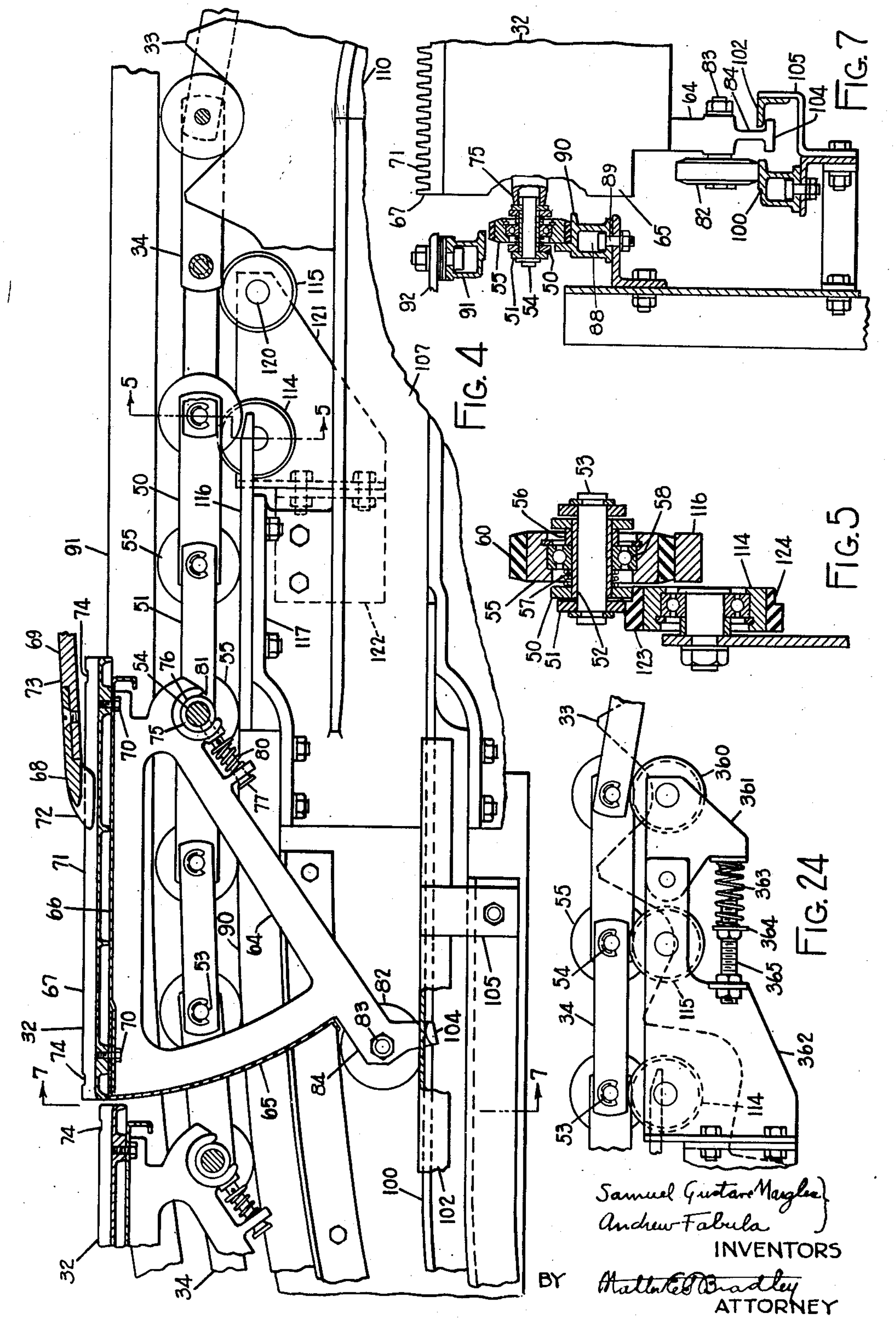
Figure 4 is a detail in longitudinal section of the upper end of the stairway illustrating the mechanism utilized in effecting the transition of the running gear chain between the track and the driving sprocket.
Figure 5 is a view in section taken along the line 5—5 of Figure 4.
Figure 7 is a view in section taken along the line 7—7 of Figure 4.
Figure 24 is a detail of a modified arrangement for effecting the transition of the running gear chain between the track and a sprocket wheel.
Figure 6:
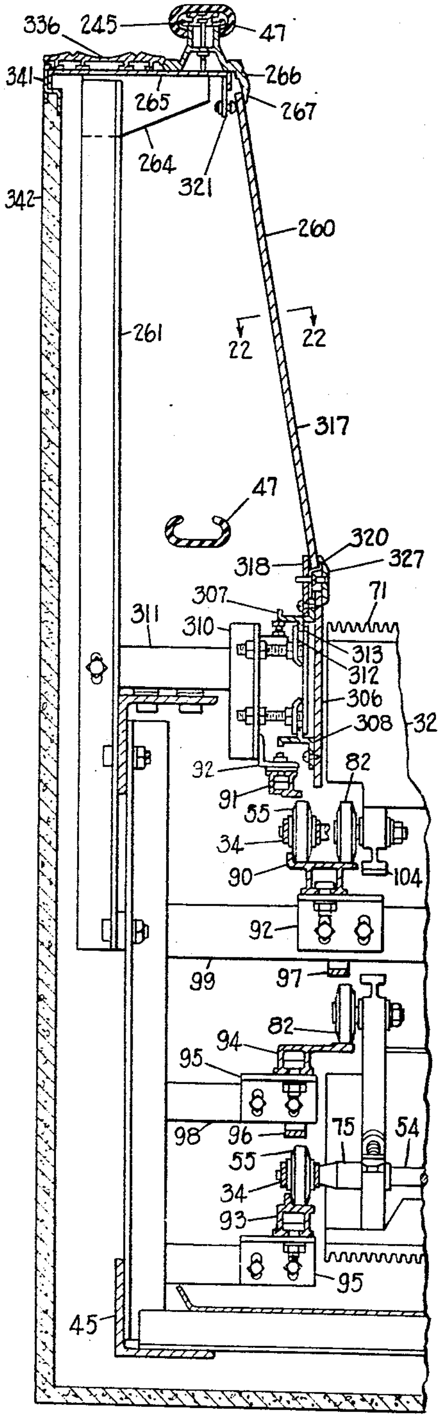
Figure 6 is a view in section of one side of the stairway taken along the incline and perpendicular thereto and as viewed from the left in Figure 1.

Referring also to Figures 6 and 7, a track system is provided for the steps between the ends of the stairway for both the upper run and the return run. The track system for the upper run comprises for each side of the stairway a supporting track 90 and up thrust track 91 for the chain wheels. A supporting track is also provided for the trailer wheels, this track being formed integral with the chain wheel supporting track on the incline (see Figure 6). These tracks are aluminum alloy extrusions and are mounted on brackets 92 secured to the truss framework. The tracks are provided with grooves 88 under the track surface shaped to receive the heads of bolts 89 which secure the tracks to the brackets. For the return run, each side of the stairway has a supporting track 93 for the chain wheels and a supporting track 94 for the trailer wheels. These tracks also are aluminum alloy extrusions and are mounted on brackets 95 secured to the truss framework. These tracks also are provided with grooves to receive the heads of the mounting bolts. An up thrust track 96 is provided on the return run for the chain wheels. This track is in the form of a steel strip and on the incline is mounted on brackets 98 secured to the truss framework. Also an up thrust track 97 is provided on one side of the stairway for the trailer wheels. This track also is in the form of a steel strip and on the incline is secured to cross members 99 of the truss framework. The upper run tracks are curved as they reach the ends of the stairway for effecting the transition of the steps between the incline and horizontal runs. These curved portions of supporting tracks for the chain wheels and trailer wheels are separated to provide the proper curvature for effecting the desired gradual transition of the steps from step to platform formation, or vice versa, depending on the direction of step movement.

These curved portions of trailer wheel track are designated 100 at the upper end and 101 at the lower end (see Figure 1). Also, up thrust tracks 102 at the upper end and 103 at the lower end are provided in these transition zones for cooperating with lugs 104 formed on extensions 84 of step yokes 64 to insure the steps remaining horizontal as these transitions take place. These additional tracks are in the form of angles secured by brackets 105 to the truss framework (see Figure 7). The up thrust tracks 96 and 97 for the transition zones on the return run are secured by brackets 106 to the corresponding supporting tracks. A channel shaped guide 107 with a semi-circular end 110 is provided on each side of the stairway for the trailer wheels at the upper end of the stairway, extending from the trailer wheel tracks for the upper and return runs. Similar channel shaped guides 111 with semi-circular ends 112 are provided for the trailer wheels at the lower end of the stairway. The upper end guides are secured together by a cross tube 113 (see Figure 2) and are mounted on the truss framework. The lower end guides are mounted on the movable carriage 40.

The chain wheels 55 mesh with the sprocket teeth to drive the running gear chains as the chains pass around the driving sprocket wheels 33. The transition of the chain on each side of the stairway between the upper run supporting track 90 and sprocket wheel 33 is effected by supporting the links on one side of the chain on rollers 114 and 115. Each of the tracks 90 is provided with a horizontal extension 116 mounted on a bracket 117 formed on the guide 107 and extending up to the sprocket wheel. The rollers 114 and 115 are mounted on pins 120 spaced chain pitch apart and supported by a bracket 121. Bracket 121 is secured to a bracket 122 mounted on guide 107 in position so that roller 114 overlaps the extension 116 and roller 115 overlaps the sprocket wheel 33. Each of rollers 114 and 115 is a ball bearing roller having a rubber tire 123 secured thereto as by vulcanizing. A portion 124 of the tire is of smaller diameter to support the wider inner links 50 in horizontal alignment with the outer links 51. An end thrust track 125 is provided on each side of the stairway for the chain rollers as they pass around the driving sprocket wheel. This track is mounted on brackets 126 and 127 secured to the truss framework.

The chain wheels 55 also mesh with the sprocket teeth as the running gear chains pass around idler sprocket wheels 37 at the lower end of the stairway. The transition of the chain on each side of the stairway between the upper run supporting track 90 and sprocket wheel 37 is effected by supporting the links on one side of the chain on rollers 128 and 129, as at the upper end of the stairway above described. The supporting bracket 130 for these rollers is mounted on guide 111 to move with carriage 40. An end thrust track (not shown) is also provided on each side of the stairway for the chain wheels as they pass around the sprocket wheel 37, this construction being similar to that for the upper end of the stairway.

Figure 3:
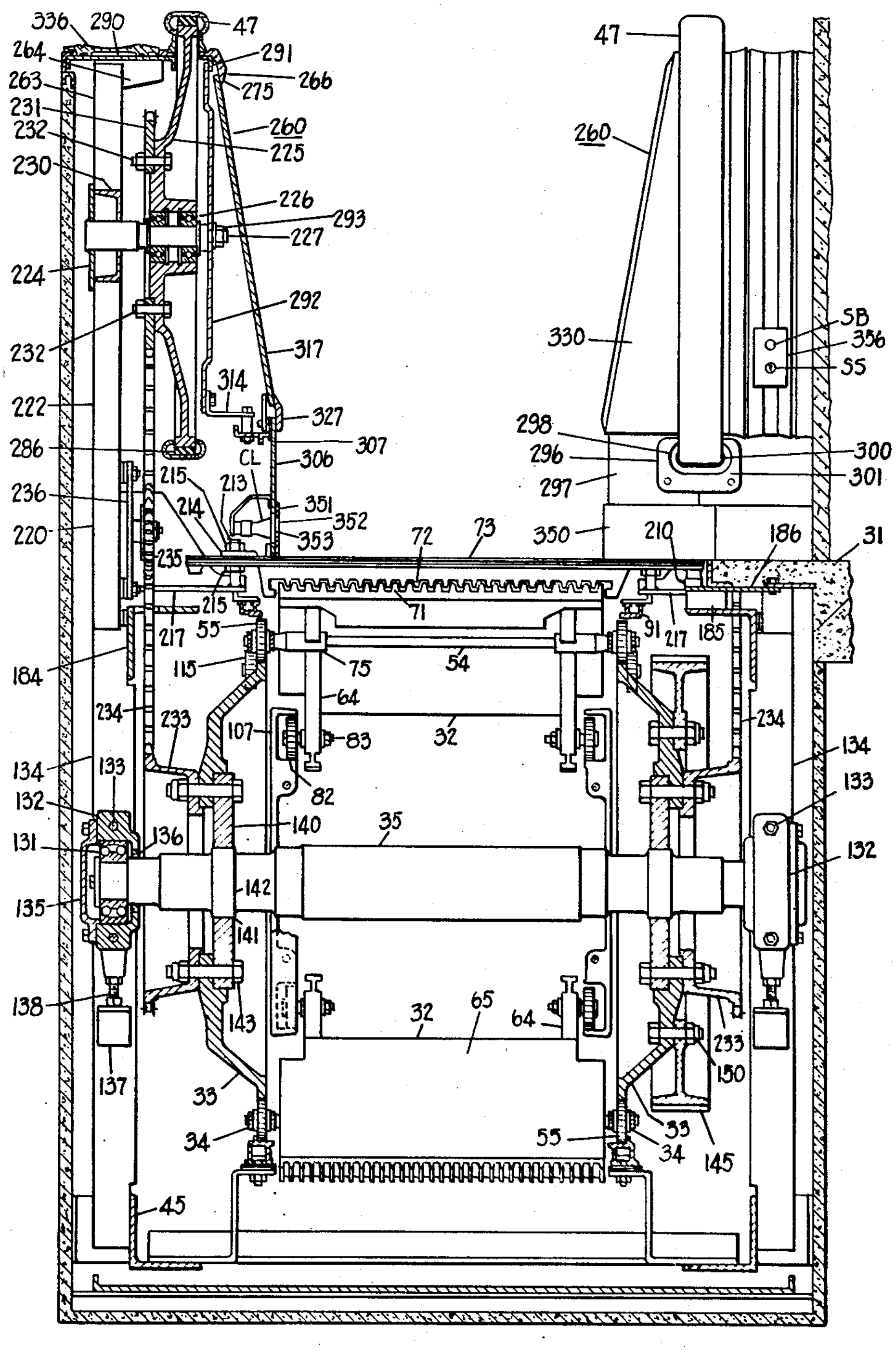
Figure 3 is an end and vertical sectional view of the upper end of the stairway as viewed from the right in Figure 2.

The main drive shaft upon which the driving sprocket wheels 33 are mounted is rotatably supported at its ends by ball bearings 131 (see Figure 3). Each ball bearing is mounted in a housing 132 secured as by bolts 133 to an upright web member 134 of the truss framework on the corresponding side of the stairway. One end of the housing is provided with a removable cover plate 135 while the other end is formed with an oil seal 136. A bracket 137 and adjusting bolt 138 extending into the housing are provided for vertical adjustment of the corresponding end of the drive shaft. The driving sprocket wheels 33 are mounted on flanges 140 formed on the main drive shaft. These flanges are in the form of discs having apertures 141 in the center thereof to accurately fit shoulders 142 machined on the shaft and are secured to the shaft by welding. The sprocket wheels are secured to these flanges by bolts 143 extending through aligned apertures in the flanges and wheels.

The drive shaft is driven from the electric motor 36 through reduction gearing. This gearing comprises a driven gear 145 on the drive shaft 35, a driving pinion 146 driven by the electric motor and an idler gear 147 between the driven gear and driving pinion, these three gears being preferably of the helical type. The driven gear 145 is mounted on the right hand sprocket wheel 33 as viewed in Figure 3, being secured thereto by bolts 150 extending through aligned apertures in the gear and sprocket wheel. The idler gear 147 is rotatably mounted on a shaft 151 supported in a gear casing 152 mounted on angles 153 secured to the lower chords 154 of the truss framework. The driving pinion 146 is driven by the motor through a worm 155 and gear 156 in the casing 152 (see Figure 1). The gear 156 and the driving pinion 146 are mounted on the shaft 157 rotatably mounted in the casing. The worm 155 is provided on a vertical shaft 158 rotatably supported in casing 152 and driven by the driving motor. The driving motor is mounted vertically, being supported by a frame 160 extending upwardly from gear casing 152. The worm shaft 158 is secured to the armature shaft of the motor so as to form a continuation thereof. A brake drum 161 is secured to the worm shaft. This drum is engaged by a pair of brake shoes 162 mounted on brake arms 163 pivotally supported on the frame 160, this mechanism being shown in Figure 2 for one side of the brake. The brake arms are connected to be operated by an electromagnet BR to release the shoes, the shoes being applied to the drum by springs not shown in Figure 2. BR1 is a switch operated by the brake. This mechanism is diagrammatically illustrated in Figure 1.

Figures 2, 8:
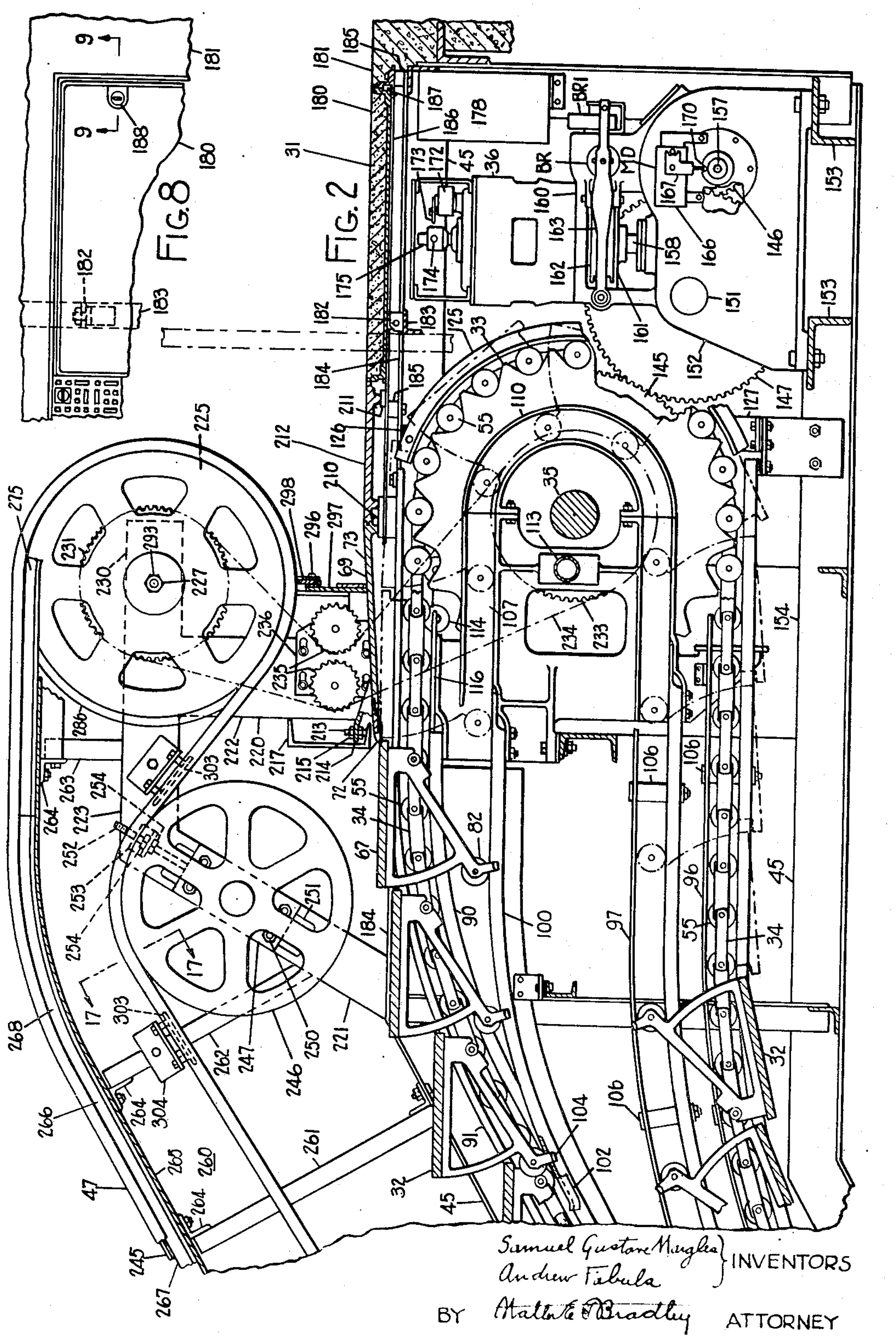
Figure 2 is a view in longitudinal section of the upper end of the stairway of Figure 1.
Figure 8 is a fragmental detail of a door for providing access to the driving motor and control switches mounted in the truss.

A motion detector switch MD, also diagrammatically illustrated in Figure 1, is provided at one end of shaft 157. The casing 166 of this switch, as shown in Figure 2, is mounted on gear casing 152 above shaft 157. The switch operating arm 167 is pivotally mounted on the switch casing. The end of this arm extends into a notch 170 formed in a disc yieldably mounted on shaft 157 as by a slip clutch.

An overspeed switch OS is mounted on the top of the motor frame in a casing 172. The switch operating arm 173 is mounted on the switch casing in position to be struck by the plunger 174 of an instantaneous type centrifugal governor 175 mounted on the upper end of the motor armature shaft. This governor is set to operate its plunger at a certain overspeed of the motor. The plunger when extended strikes the switch operating arm to open the switch contacts.

To the right of the motor is a box 178 in which are mounted various control switches for the motor. These switches are shown in the wiring diagram of Figure 23 and will be referred to later. This box is mounted on an upright of the truss framework.

Referring also to Figure 8, a door 180 is provided in the floor 181 above the motor for affording access to the motor and control switches. This door is of a pan formation with a filler and is level with the floor. The door is provided underneath with a pair of hinges 182 mounted on an angle 183 secured to the top chords 184 of the truss framework. Mounted on spacers 185 above the top chords is a plate 186 which has an opening for the door and extends below the edge of the door to form a stop 187.

Figure 9:
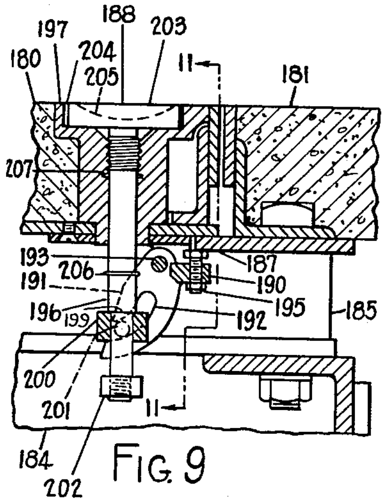
Figure 9 is a detail in section of one of the locks for the door of Figure 8, showing the door locked.
Figure 10:
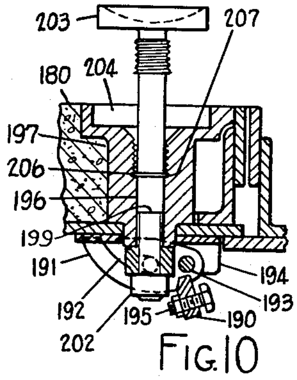
Figure 10 is a view similar to Figure 9 showing the door unlocked.
Figure 11:
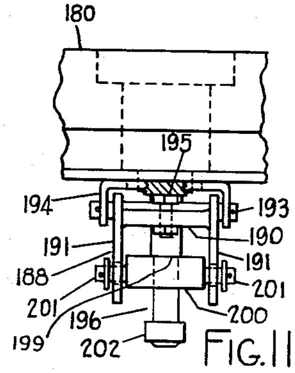
Figure 11 is a view of the lock taken along the line 11—11 of Figure 9.

A pair of identical locks 188, one on each side of the stairway, is provided for locking the door in closed position. Details of this lock are illustrated in Figures 9, 10 and 11. It comprises a locking bar 190 having a pair of members 191 at the ends thereof which are formed with aligned arcuate slots 192. This locking bar assembly is mounted on a pin 193 pivotally supported in a bracket 194 on the bottom of the door. An adjustable abutment screw 195 is provided in bar 190 and engages the bottom of stop 187 to lock the door closed. A spindle 196 threaded at its upper end to screw into a socket 197 in the door extends downwardly between members 191. A bar 200, slidably mounted on the lower portion of the spindle, has a pair of projections 201 which extend into the slots 192. On the lower end of the spindle is a pick-up collar 202. On the top of the spindle is a head 203 which fits in a depression 204 in the socket 197 to be flush with the door. A slot 205 is provided in the top of head 203 to accommodate a screw driver. The lock is shown in locking position in Figure 9. To unlock the door, the spindle is unscrewed from the socket. This brings the pick-up collar 202 up to the bar 200. The spindle is then lifted and during this movement the projections 201 cooperate with slots 192 to swing the locking bar assembly clockwise into the position shown in Figure 10. This moves screw 195 away from under stop 187, unlocking the door. With the spindle raised, a snap ring 206 on the spindle snaps into a groove 207 in the socket to latch the lock in unlocked position. The door is locked by reversing the procedure, shoulder 199 pushing down on bar 200.

Supported on additional spacers 210, 211 above plate 186 is a section of floor plate 212 which extends between the door 180 and the combplate 73 (Figure 2). The combplate is also supported on spacers 210 and at its forward end is provided on each side with an adjustable support 213 for adjusting the combplate teeth with respect to the step tread cleats. Each support comprises a projection extending upwardly from the side of supporting section 69 of the combplate and having a horizontal arm 214. This arm extends between adjusting nuts 215 on a stud secured to a channel piece 217, in turn welded to the upper newel stand 220. A similar arrangement is provided on each side of the stairway at the lower end for adjusting the combplate teeth with respect to the cleats on the step treads.

Referring especially to Figures 2 and 3 the upper newel stand 220 on each side of the stairway comprises a pair of posts 221 and 222 joined by a horizontal member 223, these being channel members. The posts are secured at their lower ends to the top chord 184 and web members of the truss framework. The newel wheel 225 for driving the handrail 47 for that side of the stairway is rotatably mounted on ball bearings 226 on a stub shaft 227 welded to an extension 230 of horizontal member 223 and to a strengthening back plate 224. The newel wheel is driven by means of sprockets and chain from the main drive shaft 35. A sprocket wheel 231 is secured by bolts 232 to the newel wheel. Another sprocket wheel 233 is secured to driving sprocket wheel 33 by bolts 143, thereby bolting the two sprocket wheels 33 and 233 and flange 140 together as a unit. A sprocket chain 234 passes around sprocket wheels 231 and 233 by means of which sprocket wheel 231 is driven by sprocket 233 and thus newel wheel 225 is driven off main drive shaft 35. The sprocket chain passes over a pair of deflector sprockets 235 pivotally mounted on a plate 236 adjustably mounted on post 222.

A newel stand 240 is also provided on each side of the stairway at the lower end thereof, as shown in Figure 1. Each stand comprises a post 241 and a horizontal member 242 extending therefrom. The post is secured at its lower end to the top chord 184 and a web member of the truss framework. The lower newel wheel 243, around which the handrail for that side of the stairway passes at the lower end of the stairway, is rotatably mounted on a stub shaft welded to the horizontal member 242.

On the upper or exposed run, each handrail 47 is guided between the newel wheels on a guide 245. On the return run each handrail passes over a tightener wheel 246. This wheel is rotatably mounted on a plate 247 adjustably secured to post 221 by bolts 250 passing through slots 251 in the post. A screw 252 mounted in a bracket 253 secured to the newel stand is provided for effecting the adjusting of the wheel 246 and when the desired tightness of the handrail has been obtained the plate 247 is clamped in place and the adjusting screw is locked in position by nuts 254.

Figure 18:
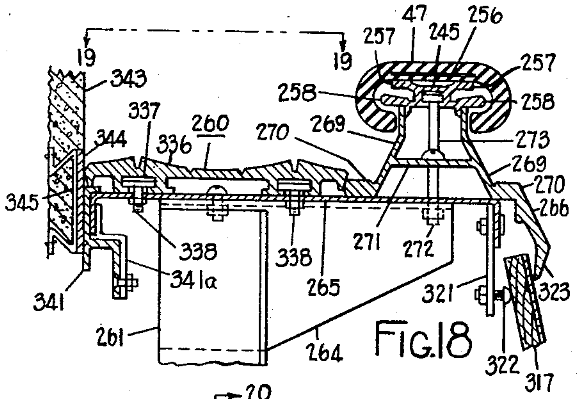
Figure 18 is a detail in cross-section of a portion of one of the balustrades.
Figure 12:
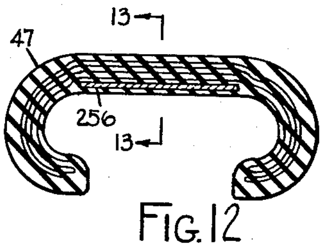
Figure 12 is a view in cross-section of one of the handrails.

The handrails are C-shaped in cross section and are of rubber reinforced with canvas (see Figure 12). Also each handrail has a steel tape 256 moulded therein of a width coextensive with the flat portion of the handrail. The handrails fit over the guides 245 which are shaped to slidably support the handrails and to guide them laterally (Figure 18). The guides are extruded and each comprises a pair of top flanges 257 for engaging the underside of the flat portion of the handrail and a pair of laterally extending flanges 258 for laterally guiding the handrail.

The guides are mounted on the balustrades 260 on each side of the stairway. Each balustrade comprises a frame made up of a plurality of structural posts 261 along the incline. These posts are secured to the top of the truss framework. At the upper bend is a post 262 secured to newel post 221. Also short posts 263 extend upwardly from the newel stands at the ends of the stairway. Angle brackets 264 extend horizontally inwardly from the posts 261, 262 and 263. Supported on brackets 264 along the incline and extending around the newel at each end of the stairawy is a sub-channel 265 made up of a plurality of sections. Mounted on this sub-channel is the handrail moulding 266. This moulding is made up of a plurality of sections. These sections are extrusions forming a pair of side members 269 which extend upwardly into the handrail and which flare outwardly below the handrail and terminate in base portions 270, as seen in Figure 18. A horizontal web 271 joins the side members. Screws 272 extend through the web at spaced intervals for securing the moulding to the sub-channel. The handrail guide 245 is clamped against the tops of side members 269 by bolts 273 extending at spaced intervals through rib 271 and having heads which project into a longitudinally extending T shaped slot in the guide. The handrail moulding sections 267 along the incline are straight and may be one or more, depending on the rise of the stairway. The end sections 268 which extend between the incline and the horizontal are bent in accordance with the balustrade curvature.

At each end of the stairway is the newel section 275 of the handrail moulding. This section extends horizontally from section 268 to the vertical center of the newel wheel and thence in a semicircle around the newel to the point where the handrail enters (or leaves) the balustrade. Section 275 is in two longitudinal halves 276 and 277 each of which is an extrusion formed into the desired shape in dies. As may be seen from Figures 15 and 16, half sections 276 and 277 have adjoining web sections 280 which extend a short distance from section 268. Each half section also has a side member 281. The portions 282 of these side members coextensive with the web sections are of a height to support the handrail guide, these portions forming a continuation of the side members 269 of section 268.

Figures 14, 15, 16, 17:
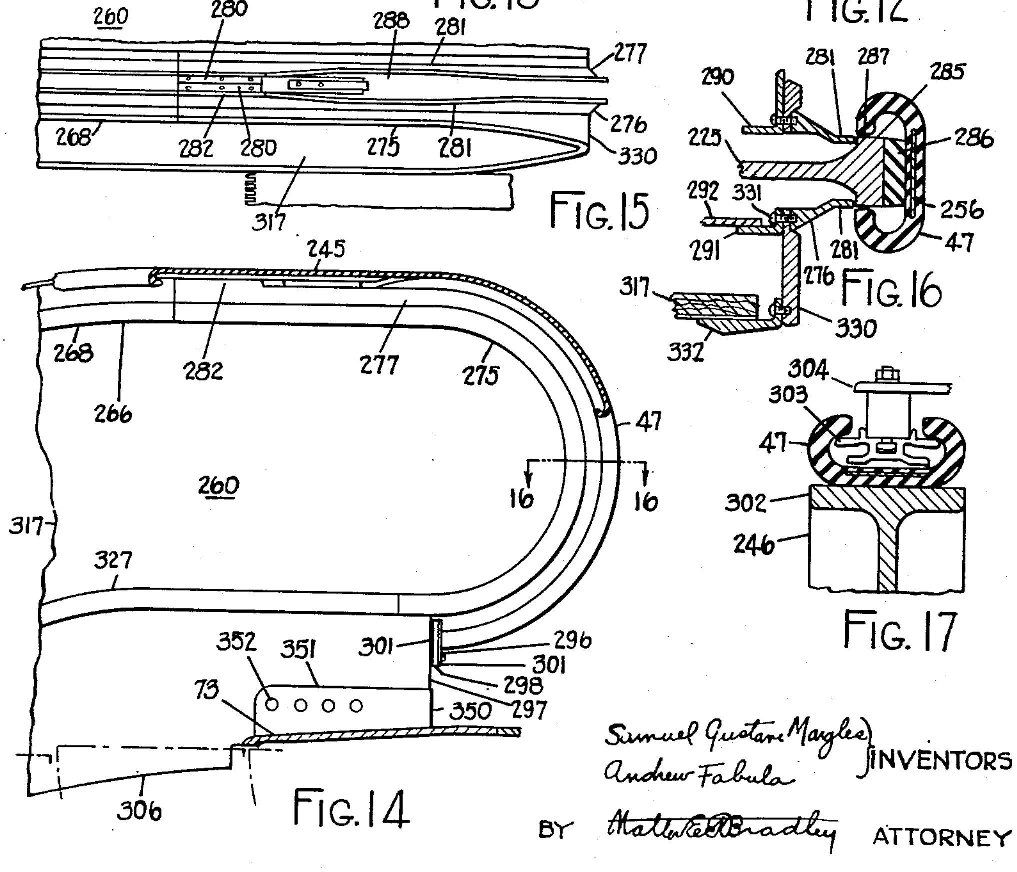
Figure 14 is a view in side elevation, with parts in section, showing the balustrade on one side of the stairway at the upper end.
Figure 15 is a top view of the balustrade of Figure 14 with the handrail and newel wheel removed.
Figure 16 is a view in section taken along the line 16—16 of Figure 14.
Figure 17 is a detail in cross-section taken along line 17—17 of Figure 2.

The rim 285 of each newel wheel, except for a slight operating clearance, is of the same width as the handrail opening, as shown in Figure 16. Also the rim of each of the driving newel wheels has a rubber tire 286 vulcanized thereto. This arrangement serves to guide the handrail around the newel without friction along the inturned edges 287 of the handrail, gives adequate support to the flat portion of the handrail and provides ample friction at the driving newels. To enable the newel wheel to emerge from (or pass into) the balustrading, the side members 281 of the handrail moulding are shaped to spread from each other at 288 sufficiently for the rim to get through. Also the side members 281 beyond the portions 282 are of less height to fit beneath the handrail edges 287 where the transition is made to minimize any pinching hazard. Beyond the transition zone the side members are brought back together and under the handrail rim as shown in Figure 16. The handrail guide 245 extends up to just short of the vertical center of the newel wheel. Beyond the end section 268, the guide is supported on portions 282 of side members 281 and beyond this point on an extension block secured as by screws to web sections 280 and extending into the opening for the newel wheel rim.

The section 290 of sub-channel 265 is narrowed at the newel to enable the newel wheel to extend through the balustrade. Also because of the newel wheel, the angle brackets 264 at the newel are shorter than along the incline. A semi-circular angle 291 aligned with section 290 is provided on the other side of the newel wheel. To support angle 291 a semi-circular plate 292 is mounted on the newel wheel stub shaft 227 and held in place by a nut 293. This plate extends under the angle as it passes around the bend. This arrangement in turn supports the newel section 275 around the end of the newel.

A handrail guard 296 is provided for the handrail opening in each newel end panel 297 at each end of the stairway. This guard comprises a rubber collar 298 having an opening 300 of the same shape as the handrail through which the handrail passes. The size of the opening is such as to provide considerable clearance for the handrail, say ⅛ of an inch. This collar is arranged between two plates 301 to which it is secured as by vulcanizing. Openings are provided in these plates around the collar of the same contour but larger than the collar opening. This guard assembly is secured to the balustrade as by screws. Inasmuch as the newel end panel 297 is aligned with the axis of the newel wheel giving a full 180° extension of the newell, the handrail opening is relatively inaccessible and there is little chance of any hand being carried around to the handrail opening or the opening being seen by curious children. The guard minimizes the possibility of any serious damage should fingers come to this point.

Each handrail makes a reverse bend in passing around its tightener wheel 246. The rim 302 of this wheel, as illustrated in Figure 17, is flat or slightly convex. A guide 303 is provided for the handrail on each side of the tightener wheel. Each guide is made up of a section of handrail guide 245 and is mounted on a bracket 304. The bracket for the guide on the driving newel wheel side of the tightener wheel is mounted on the newel stand 220 while the bracket for the guide on the incline side of the tightener wheel is mounted on the adjacent post 262. One or more similar guides may be provided for the return run of the handrail along the incline, depending on the stairway rise.

A skirt panel 306 extends from the newel end panel 297 at each end of the stairway along the sides of the steps. It is made up of a plurality of sections, those along the incline being straight and those at the bends being shaped to conform with the stairway curvature. The skirt panel is preferably of plymetal and along with the step risers may be provided with porcelain enamel surfaces of suitable color such as blue black. The skirt panel is secured as by screws to channel members 307 and 308 in the form of extrusions extending one above the other between the ends of the stairway. The upper channel member is supported by brackets 310 welded to angle members 311 adjustably mounted on the truss framework. The connection to each bracket 310 is effected by a clamp 312 which engages a rib 313 formed on the channel member. The lower channel member is also supported by the brackets 310 through a clamp connection similar to that for the upper channel member. The upper channel member 307 extends beyond the lower channel member 308 and is supported at each end by a bracket 314 secured to plate 292. The supporting brackets 92 for the up thrust tracks 91 for the chain rollers are welded to the brackets 310.

The balustrade side panel 317 on each side of the stairway is made up in a plurality of sections and extends from the handrail moulding to the skirt panel and at the ends of the stairway follows the contour of the newels. This panel also may be of plymetal with a porcelain enamel surface of suitable color such as light gray. A strip 318 coextensive with channel member 307 is secured to this member at intervals by the screws which fasten the skirt panel. At intervals along this strip are clips 320 on which the lower edge of the side panel rests. At intervals plate 321 are secured to sub-channel 265 as by screws (see Figure 18). Each plate has adjustably secured thereto an abutment bolt 322 against which the top of the side panel rests. The handrail moulding is formed with an extension 323 which fits over the top of the panel. A skirt moulding 327, secured to strip 318 as by screws, covers the gap between the side panel and the skirt panel and clamps the panel in place.

Due to the relative positions of the handrail and steps, the side panel slopes inwardly from top to bottom. A tapered semi-circular plate 330 fills in the space between the newel section of the handrail moulding and the side panel. This plate is secured as by concealed screws 331 (Figure 16) to the inner half 276 of the newel section, these screws also serving to secure this half of the newel section to angle 291. Also, for convenience, the newel side moulding 332 which continues from extension 323 of the handrail moulding is formed separately and secured by concealed screws to plate 330. The newel sections of the side panel rest against adjustable abutment bolts secured at spaced intervals to semi-circular plate 292. In mounting the side panels on the balustrade, they are slid between the abutment bolts 322 and mouldings 323 and 332 and thence down on the clips 320. T shaped cover strips 334 (see Figure 22) are provided for the joints between side panels.

Figure 13:
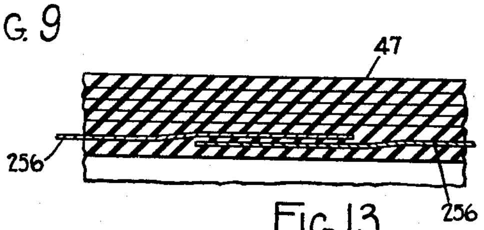
Figure 13 is a longitudinal section of a portion of the handrail taken along the line 13—13 of Figure 12.

With this construction of balustrade, the handrails 47 may be formed as continuous loops in the factory and slid in place before the side panels are installed. In forming the loops, the ends of the handrail are vulcanized together. In this process, the ends of the steel tape 256 are also vulcanized together by providing overlapping ends (see Figure 13) coated with rubber cement. In installing a handrail, it is pulled sidewise over its guide 245 on the upper run, led over the newel wheels at the ends of the stairway and forced over the guides 303. It is then placed over the tightening wheel 249 and this wheel is adjusted to the desired tightness.

Figure 19:
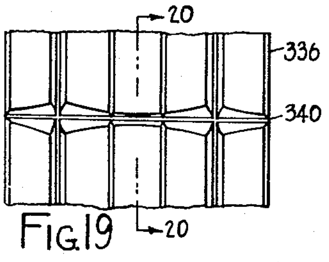
Figure 19 is a detail of the balustrade deck moulding as viewed along the line 19—19 of Figure 18.
Figure 20:
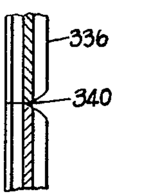
Figure 20 is a view in section taken along the line 20—20 of Figure 19.

The remainder of the top and newel of the balustrade on each side of the stairway is covered by a deck moulding 336. This moulding is an extrusion made up of a plurality of sections. This moulding is formed with longitudinal slots 337 for receiving the heads of bolts 338 for securing the moulding to the sub-channel 265. The ends of the sections are formed to provide a groove 340 when their ends are abutting, as shown in Figures 19 and 20. This construction effectively disguises slight gaps and misalignment in the joints due to manufacturing or assembly.

Beneath the outer edge of the deck moulding is an edge moulding 341. This moulding is bolted at intervals to brackets 341a welded to the sub-channel 265. This moulding forms an anchor for metal lath when the stairway is formed with an outside wall 342 as shown in Figure 6. Where the stairway abuts a plastered wall 343, the moulding 341 abuts a plate 344. This plate has clips 345 welded thereto at spaced intervals. These clips serve as anchors for the metal lath for the building wall. Before the plaster is applied, a plurality of brackets 346 are temporarily screwed to subchannel 265 and plate 344 at spaced intervals to hold the plate and lath in place. After the plaster has been applied, these brackets are removed. This allows movement between the stairway and the building wall while presenting the appearance of a solid joint. The deck mouldings are applied after the brackets 346 are removed. Also the deck mouldings are secured in place before the side panels are put on.

A kick plate 350 is provided at each end of the stairway on each side. This plate extends across the bottom of end panel 297 and around the corner and along a portion of the skirt panel.

This skirt panel section 351 of the kick plate is provided with a plurality of apertures 352. Behind these apertures the skirt panel is provided with an elongated aperture to receive a strip of Lucite 353. In back of the Lucite are a plurality of lamps CL, one for each aperture. In this way the steps and comb plates at the ends of the stairway are illuminated.

At each end of the stairway on one side thereof is a stop and start control fixture 356 (Figure 3). This fixture is mounted on the deck moulding on the end of the balustrading below the horizontal center of the newel. It comprises a face plate containing a red stop button SB and a key operated start switch SS. The key switch is turned in one direction to start the stairway in the up direction and in the other direction to start the stairway in the down direction. The contacts of the key switches and stop buttons are shown in the wiring diagram, Figure 23.

Referring to Figure 23, which illustrates the electrical control system for the moving stairway, the stairway driving motor is illustrated as a three phase squirrel cage induction motor. The stator windings of this motor are designated DM1, DM2 and DM3 and the rotor is designated DMR. L1, L2 and L3 are the alternating current supply lines for this motor. K is a triple pole knife switch in the supply lines. The electromagnetic control switches employed are designated generally as:

D Down direction switch
H Up time relay
U Up direction switch

Numerals are appended to these letters in designating the contacts of the switches. Direct current for operating these switches and for energizing the electromagnet BR of the electromechanical brake is derived from the alternating current lines through transformer TRF and polyphase rectifier RF.

To start the stairway in the up direction the key operated start switch SS at either end of the stairway is turned counterclockwise. This completes a circuit for the coil of up direction switch U through interlock contacts D4, stop buttons SB, broken chain switches BC and overspeed switch OS. Switch U operates to separate interlock contacts U4 in the circuit for the coil of switch D. It also engages contacts U5 to complete the circuit for the coil of relay H. Relay H engages contacts H1 to complete a circuit for combplate lamps CL of which only four are illustrated. It also engages contacts H2 which together with the engagement of contacts U6 completes a circuit for the release coil BR of the electromagnetic brake. At the same time contacts U1 and U2 complete a circuit for the stator windings of the driving motor. As a result the brake lifts and the motor starts moving the stairway in the up direction. The brake upon lifting separates contacts BR1 to insert cooling resistance R5 in circuit with the brake release coil. As the stairway starts, motion detector switch MD closes, completing a holding circuit for the coil of switch U through resistance R1 and contacts U3. This enables the key switch to be returned to neutral and the key withdrawn without interrupting the running of the stairway.

To stop the stairway the stop button SB at either end of the stairway is pressed. This breaks the circuit for the coil of switch U which drops out. The separation of contacts U1 and U2 breaks the circuits for the stator windings of the driving motor. The separation of contacts U6 inserts further resistance R4 in circuit with the brake release coil. However sufficient current is still supplied to brake coil BR to maintain the brake released. Switch U also separates contacts U5 which breaks the circuit for the coil of relay H. This relay does not drop out immediately being delayed by the discharge of condenser CO into its coil. Upon dropping out it separates contacts H2 which breaks the circuit for the brake release coil BR. The time interval provided by relay H is sufficient to enable the stairway to coast to a stop without the application of the brake, thereby avoiding a stop which might be too abrupt for people on the stairway at the time of the stop. The brake when applied holds the stairway against reversing under load. This control of the brake is of especial advantage in case of stops effected by a safety device which are likely to occur with passengers on the stairway. Switch MD acts to break the holding circuit for the coil of up direction switch U in case of reversal of the stairway while ascending.

The stairway may be started in the down direction by either start switch being turned clockwise. This completes a circuit for the coil of switch D through interlock contacts U4, stop buttons SB, broken chain switches BC and overspeed switch OS. Switch D upon operation separates interlock contacts D4 and engages contacts D3 in the circuit for combplate lamps CL. It also engages contacts D6 to complete a circuit for the release coil BR of the brake. At the same time it engages contacts D1 and D2 to complete a circuit for the stator windings of the driving motor, this circuit being such as to cause a phase rotation of applied voltage opposite to that established by switch U. As the brake is released and the circuit is completed for the driving motor, the stairway starts in the down direction. Switch D also engages contacts D5 which complete a holding circuit through resistance R1 for the coil of switch D, enabling the key to be returned to center and withdrawn without interrupting the running of the stairway.

To stop the stairway, either stop button SB is pressed. This breaks the circuit for the coil of switch D which drops out to disconnect the driving motor from the supply lines and to deenergize the brake release coil. As a result the brake is applied to bring the stairway to a stop.

The brake is applied immediately when stopping a down moving stairway to avoid too long a slow down when the stairway is under load.

The above described moving stairway is of simple construction, economical to manufacture and install and is smooth and quiet in operation. Also it is very pleasing in appearance and safe in operation. The stairwell opening provides sufficient room at the upper end of the stairway to receive the driving motor, thereby obviating any separate motor room outside the truss. Also this construction gives ready accessibility as by providing a door in the floor, this being especially important from the standpoint of maintenance. The door locks obviate removing any parts to unlock the door which might drop into the machinery and provide suitable handles for lifting the door.

The direct gear connection from the driving motor to the main drive shaft obviates any brake on the main drive shaft, which is usually termed a stairway brake, the braking being effected on the motor shaft alone where an electromechanical brake of low torque is suitable. The elimination of the stairway brake not only greatly simplifies the stairway construction but also enables a much simplified control system to be utilized.

The wheels for supporting the fronts of the steps are arranged between chain links, thus obviating extended axles. The chain pins intermediate the step axles are also provided with wheels of the same diameter and construction as the supporting wheels, the step axles being of the same diameter at the wheels as the chain pins. Both the supporting wheels and the intermediate wheels run on the supporting tracks. This is of especial importance in connection with the wheels passing over the transition curve in the tracks at the upper end of the incline as the load on the wheels due to the tension in the chains is considerable at this point. If only the step supporting wheels ran on the tracks, this load at this transition curve would be assumed entirely by these wheels. However, with the intermediate wheels also running on the tracks, this load is distributed equally to all wheels. Thus with two intermediate wheels in the construction illustrated, the load per wheel due to chain tension is only one-third that which would be applied to the step supporting wheels in a construction where they alone ran on the tracks. Thus smaller wheels may be utilized. Also the utilization of the intermediate wheels obviates any jack knife link construction for preventing chain sag between step axles. Furthermore, making the trailer wheels of the same size and construction as the chain wheels is of advantage from a manufacturing standpoint.

The step supporting wheels as well as the intermediate wheels mesh with the teeth of the driving sprocket wheels and idler sprocket wheels. This provides a simplified construction which is of particular advantage in the driving of the stairway. As these wheels have rubber tires, any noise due to the wheels meshing with the sprockets is minimized. This is aided by the chain link supporting rollers which reduce to a negligible amount the sawing of the chain as the transfer of the wheels between the supporting tracks and sprocket wheels is effected. Thus any noise of impact as the transition takes place is minimized. These supporting rollers also are rubber tired.

The extruded tracks are of importance. Tracks have an optimum shape from the standpoint of guiding, wear, strength and stiffness. These shapes can be readily obtained with extrusions. Also, by extruding the tracks provision may be readily made for the fastening bolts without having the bolt heads exposed on the track surface in the path of the chain and trailer wheels. These track extrusions are made of aluminum alloy which make the tracks light in weight. Furthermore there is also advantage in making the step yokes of aluminum alloy. This also reduces the weight of the stairway and in addition due to their light weight reduces track wear, maintenance and power consumption and also aids in minimizing noise as during transition of the trailer wheels between supporting and outthrust tracks at the ends of the stairway. Also, the demarcation lines on the steps aid the passengers in their transfer to and from the stairway, especially in stepping onto the stairway, thereby contributing to the minimizing of accidents.

Each handrail has a single wrap traction drive.

The newel wheels at the upper end of the stairway are rubber tired to provide the desired traction. The desired tension in the handrail is obtained by the adjustable tightener wheel over which the handrail passes with a reverse bend on its return run. This greatly simplifies the construction. Simple structural balustrade framework is employed and the arrangement is such that the handrail is installed as an endless loop. This enables the splice in the handrail to be made in the factory. The steel tape insert in the handrail prevents closing of the handrail at the lips, thus obviating any friction between the handrail and balustrade. The ends of this tape are effectively joined by vulcanizing, this being effected by a lap splice with a film of rubber between to which the ends of the tape are vulcanized. This eliminates any breaking of the tape at or near the point of joinder.

Many changes in the construction described can be made within the scope of the present invention. For example, another roller 360 may be added to rollers 114 and 115 to aid in the transition of the chain between the sprocket wheel and supporting track, as shown in Figure 24. This added roller is spaced chain pitch from roller 115 and is mounted on an arm 361 pivotally supported on bracket 362. This arm is biased by a spring 363 to move roller 360 in a direction to cushion the picking up of the chain wheels by the sprocket wheel. This spring extends between the arm 361 and an adjustable seat 364 on mounting screw 365 mounted on bracket 362.

The combsections 68 of the combplate may be of a plastic material such as canvas Bakelite. Thus the combplate teeth may be straightened readily if slightly bent and if bent enough to get in front of the tread cleats they do not act as a cutting tool to shear off tread cleats. Furthermore these phenolic materials may be made of various colors to meet different color schemes and would aid in distinguishing the combplates from the step treads at the entrance and exit of the stairway.

Figures 21, 25, 26, 27:
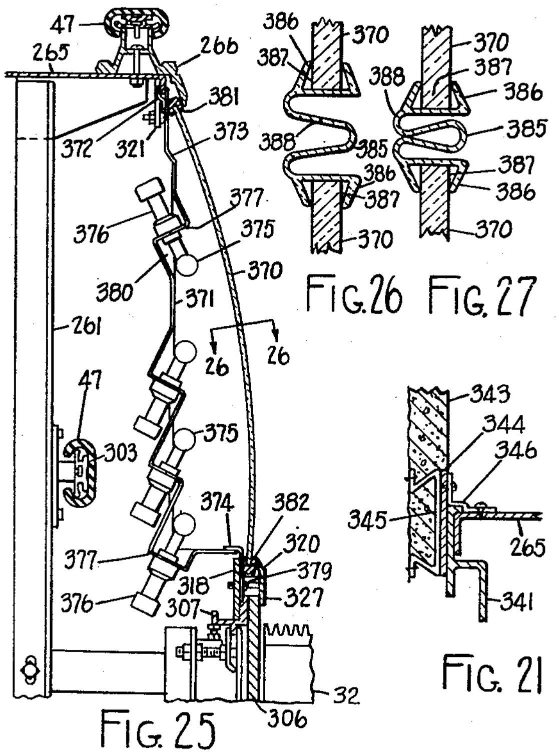
Figure 21 is a detail illustrating the manner of securing the balustrade to a building wall during construction.
Figure 25 is a detail in cross-section of a modified arrangement of balustrade.
Figure 26 is a detail in section taken along the line 26—26 of Figure 25 illustrating a flexible cover for a joint between balustrade side panels.
Figure 27 is a view similar to Figure 26 with a lesser distance between panels.

Also many changes may be made in the arrangement of the balustrade. For example, the side panels may be made of a translucent tempered glass 370 of a suitable color, curved toward the longitudinal center of the stairway as shown in Figure 25. This glass may be illuminated by transmitted light to present a very pleasing effect as well as to illuminate the stairway. A cold cathode tube arrangement is illustrated which is arranged in front of a reflector plate 371. This plate is secured at the top by clips 372 secured at intervals to the plate and extending behind the side of sub-channel 265. The reflector plate bends outwardly at 373 and at the bottom is bent to the right to the skirt board where it has a plurality of spaced clips 374 which are secured to strip 318 as by screws 379. The cathode tube sections 375 are supported by porcelain receptacles 376 which are mounted on the bases 377 of pockets 380 formed in the reflector plate. The upper and lower edges of the glass side panels are provided with rubber strips 381 and 382, cemented to the glass. These panels are mounted much in the same manner as the plymetal panels, the upper rubber strip 381 fitting between the reflector plate and the handrail moulding and the lower rubber strip 382 supported by clips 320. Around the newels, the rubber strip is held in place by clips secured to plate 330 (not shown), the glass side panel at the newels being moulded to fit this plate.

The joints between these glass side panels are provided with flexible covers 385 as illustrated in Figures 26 and 27. These covers are extruded transparent plastic mouldings. Along the edges 386 the moulding is trough shaped to fit over the adjoining edges 387 of the glass panels. The portion 388 of the moulding between the edges is accordian shaped, thereby facilitating the moulding fitting different width gaps between the glass panels, as indicated in these figures. The back of the accordian portion of the moulding has a light coat of paint of a color to match the panels and to give about the same amount of light transmission.

Each of the handrails on the incline of the return run is turned edgewise and positioned out of the way of the reflector plate 371. This is accomplished by turning through an angle of 90° the guides 303 on the incline of the return run and mounting these guides directly on posts 261 as illustrated. The handrail is installed before the reflector plate and glass panels are put in place.

As many apparently widely different embodiments of the invention may be made without departing from the scope thereof, it is intended that all matter contained in the above description or shown in the accompanying drawings shall be interpreted as illustrative and not in a limiting sense.

What is claimed is:

1. A moving stairway comprising, a plurality of steps, each step having an axle, a pair of running gear chains, one on each side of the steps, connecting said axles, a pair of sprocket wheels at one end of the stairway around which the chains pass, a pair of supporting wheels for each step, one on each side of the step, arranged on the step axle between side links of the chain on the corresponding side of the step, additional wheels arranged on the chain pins of each chain intermediate said supporting wheels, each of said supporting wheels and additional wheels being mounted on ball bearings and having a rubber tire vulcanized thereto, all of said supporting wheels and additional wheels being of the same size and both the supporting wheels and additional wheels meshing with said sprocket wheels, a pair of supporting tracks, one for each side of the steps, upon which all of said supporting tracks, one for each side of the steps, upon which all of said supporting wheels and additional wheels on the corresponding side of the stairway run up to said sprocket wheels, each of said tracks stopping short of the sprocket wheel, and a pair of rubber tired ball bearing rollers for each side of the stairway spaced chain pitch apart for supporting the links on one side of the chain on that side of the stairway during transition of the supporting wheels and additional wheels of that chain between the track and the sprocket wheel on that side of the stairway.

2. A moving stairway comprising, a plurality of steps, a running gear chain connecting said steps, a sprocket wheel at one end of the stairway for driving said chain and around which the steps pass, a track for supporting said steps to just short of the sprocket wheel, and a tangential guide for supporting said chain during the transition of the steps between the track and sprocket wheel, said guide including rotatable means upon which links of said chain run during said transition.

3. A moving stairway comprising, a plurality of steps, a running gear chain connecting said steps, a sprocket wheel at one end of the stairway around which the chain passes, a supporting wheel for each step arranged between side links of the chain, additional wheels arranged on the chain pins intermediate said supporting wheels, both the supporting wheels and additional wheels being of the same size and meshing with said sprocket wheel, a track upon which all of said supporting wheels and additional wheels run from the other end of the stairway to just short of the sprocket wheel, and means extending from the track to and overlapping the sprocket wheel for supporting the supporting wheels and additional wheels during their transition between the track and sprocket wheel.

4. A moving stairway comprising, a plurality of steps, a running gear chain connecting said steps, a sprocket wheel at one end of the stairway around which the chain passes, a supporting wheel for each step arranged between side links of the chain, additional wheels arranged on the chain pins intermediate said supporting wheels, both the supporting wheels and additional wheels being of the same size and meshing with said sprocket wheel, a track upon which all of said supporting wheels and additional wheels run from the other end of the stairway to just short of the sprocket wheel, and means extending from the track to and overlapping the sprocket wheel for supporting the chain links during the transition of the supporting wheels and additional wheels between the track and sprocket wheel.

5. A moving stairway comprising, a plurality of steps, a running gear chain connecting said steps, a sprocket wheel at one end of the stairway around which the chain passes, a supporting wheel for each step arranged between side links of the chain, additional wheels arranged on the chain pins intermediate said supporting wheels, both the supporting wheels and additional wheels being of the same size and meshing with said sprocket wheel, a track upon which all of said supporting wheels and additional wheels run from the other end of the stairway to just short of the sprocket wheel, and a plurality of rollers positioned between the track and sprocket wheel, one of which overlaps the sprocket wheel, for supporting the chain links on one side of the chain.

6. A moving stairway comprising, a plurality of steps, a running gear chain connecting said steps, a sprocket wheel at one end of the stairway around which the chain passes, a supporting wheel for each step arranged between side links of the chain, additional wheels arranged on the chain pins intermediate said supporting wheels, both the supporting wheels and additional wheels being of the same size and meshing with said sprocket wheel, a supporting track upon which all of said supporting wheels and additional wheels run up to said sprocket wheel, said track stopping short of the sprocket wheel, and a pair of rubber tired rollers spaced chain pitch apart for supporting the chain links during transition of the supporting wheels and additional wheels between the track and sprocket wheel.

7. A moving stairway comprising, a plurality of connected steps, supporting wheels for said steps, a stairway truss, a track for said wheels on each side of said stairway, supporting brackets for each track secured to said truss, and bolts for securing each track to said brackets, each track being an aluminum alloy extrusion and having a groove linearly coextensive with the track surface and on the opposite side thereof and formed by side members spaced to receive the heads of said bolts and bent inwardly toward each other to retain the bolt heads in the groove but to leave a slot for the shanks of said bolts.

8. A moving stairway comprising, a plurality of steps, a pair of running gear chains, one on each side of the steps, to which opposite sides of the steps are connected, a pair of sprocket wheels at one end of the stairway, one on each side of the steps, around which the chains pass, a pair of supporting wheels for each step, one on each side of the step, arranged between side links of the chain on the corresponding side of the step, additional wheels arranged between the side links of each chain intermediate said supporting wheels, all of said supporting wheels and additional wheels being of the same size and both the supporting wheels and additional wheels meshing with said sprocket wheels, a pair of supporting tracks, one for each side of the steps, upon which all of said supporting wheels and additional wheels on the corresponding side of the stairway run between the other end of the stairway and said sprocket wheels, and a pair of up thrust tracks, one for each side of the steps, extending between the ends of the stairway for all of said step supporting wheels and additional wheels on the corresponding side of the stairway.

References Cited in the file of this patent

UNITED STATES PATENTS

| Number | Name | Date |
|---|---|---|
| 1,375,711 | Lower | Apr. 26, 1921 |
| 2,016,104 | Cooper | Oct. 1, 1935 |
| 2,023,067 | Dunlop | Dec. 3, 1935 |
| 2,030,103 | Dunlop | Feb. 11, 1936 |
| 2,039,994 | Herker | May 5, 1936 |
| 2,044,158 | Dunlop | June 16, 1936 |
| 2,101,172 | Gegenheimer | Dec. 7, 1937 |
| 2,225,772 | Dunlop | Dec. 24, 1940 |
| 2,259,366 | Dunlop | Oct. 14, 1941 |
| 2,260,591 | Thurston et al. | Oct. 28, 1941 |
| 2,275,048 | Hohnecker | Mar. 3, 1942 |
| 2,292,534 | Margles | Aug. 11, 1942 |
| 2,373,764 | Lautrup et al. | Apr. 17, 1945 |

FOREIGN PATENTS

| Number | Country | Date |
|---|---|---|
| 5 of 1908 | Great Britain | Jan. 1, 1908 |
| 558,325 | Germany | Sept. 5, 1932 |
| 748,868 | France | Apr. 25, 1933 |